F. A. GILCREST.
VALVE FOR AUTOMOBILE TIRES OR THE LIKE.
APPLICATION FILED SEPT. 10, 1910.
1,048,955.
Patented Dec. 31, 1912.
2 SHEETS—SHEET 1.
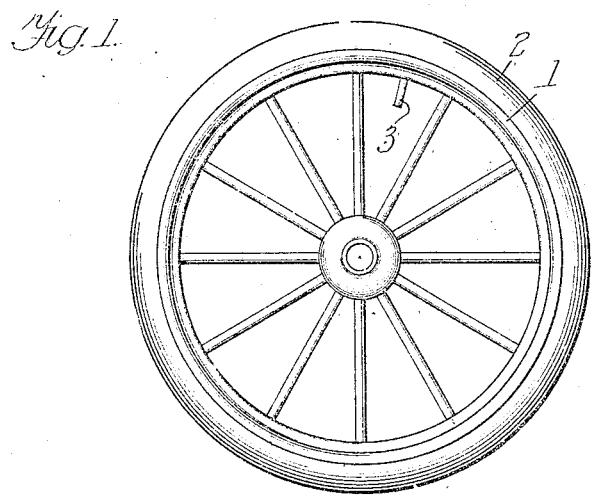
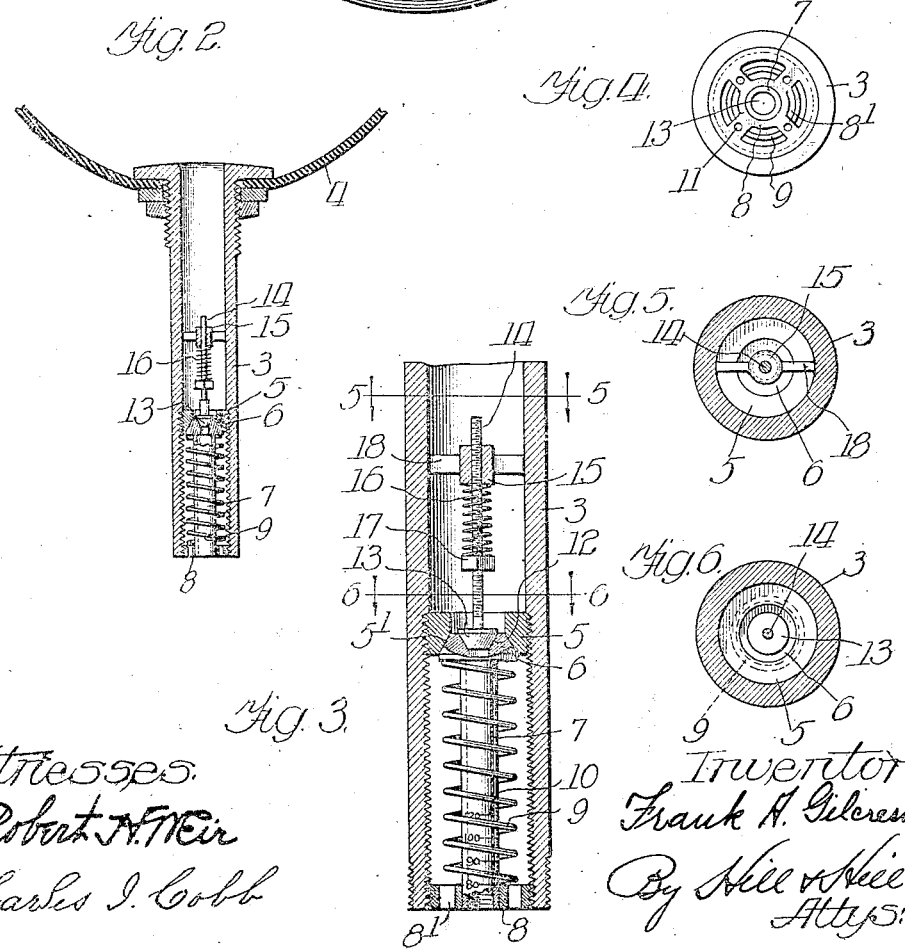
Witnesses:
Robert N. Weir
Charles I. Cobb
Inventor
Frank A. Gilcrest,
By Hill & Nice
Attys.

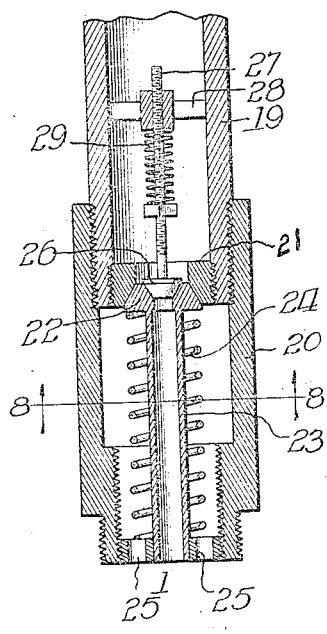
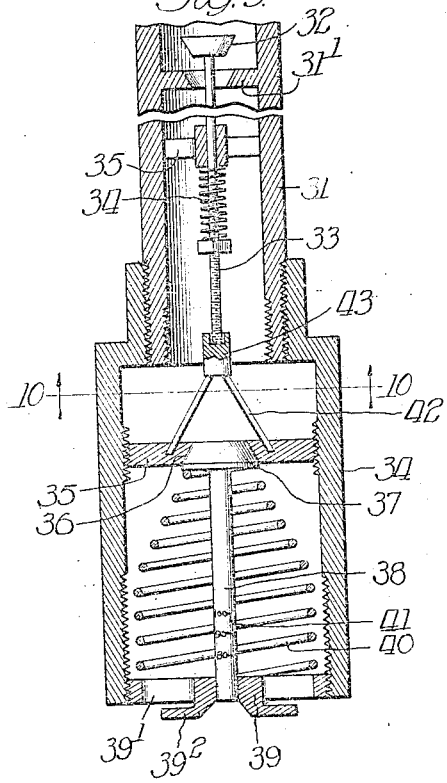
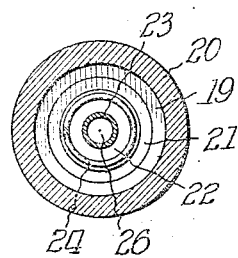
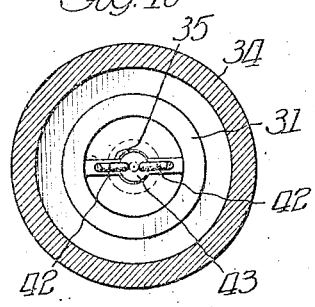
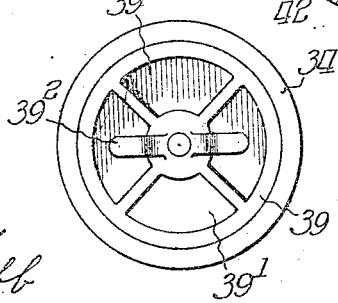

UNITED STATES PATENT OFFICE.

FRANK A. GILCREST, OF KEARNEY, NEBRASKA.

VALVE FOR AUTOMOBILE-TIRES OR THE LIKE.

1,048,955.  Specification of Letters Patent.  Patented Dec. 31, 1912.

Application filed September 10, 1910. Serial No. 581,388.

*To all whom it may concern:*

Be it known that I, FRANK A. GILCREST, a citizen of the United States, residing at Kearney, in the county of Buffalo and State of Nebraska, have invented certain new and useful Improvements in Valves for Automobile-Tires or the Like, of which the following is a description.

My invention belongs to that general class of devices known as valves and relates particularly to a valve applicable for use on automobile tires or the like that will regulate the pressure of the fluid within the tire and prevent tire blow-outs as well as prolong the life of the tire, and has among its objects the production of a simple, convenient, efficient, and satisfactory device of the kind described for use wherever found applicable.

To this end my invention consists in the novel construction, arrangement and combination of parts herein shown and described and more particularly pointed out in the claims.

In the drawings wherein like reference characters indicate like or corresponding parts, Figure 1 is a side elevation of an automobile wheel and tire with my device applied thereto, Fig. 2 is a longitudinal sectional view of one form of valve, Fig. 3 is an enlarged view of a portion of the same, Fig. 4 is an end elevation of the same, Fig. 5 is a cross sectional view taken substantially on line 5—5 of Fig. 3, Fig. 6 is a cross sectional view taken substantially on line 6—6 of Fig. 3, Fig. 7 is a longitudinal sectional view of a slightly modified form, Fig. 8 is a cross sectional view of the same taken substantially on line 8—8 of Fig. 7, Fig. 9 is a longitudinal sectional view of another modified form applicable for use on the usual form of valve device on tires, Fig. 10 is a cross sectional view taken substantially on line 10—10 of Fig. 9, and Fig. 11 is an end elevation of the same.

Referring to the drawings, 1 represents an automobile or bicycle wheel or the like, and 2 the tire provided with a tube, casing or stem 3. The stem 3 may be secured to the tire in any suitable way, it being understood that the device is applicable to any style of tire, either single or double tube. The casing or stem 3 is provided with a valve seat member 5 arranged therein, having a valve seat 5¹ on which normally seats a valve member 6. The valve member 6 is provided with a stem 7 hollow, the same being guided in any suitable manner, as shown by the member 8. A resilient member 9 coöperating with the valve and with the member 8 normally maintains the valve upon its seat. The member 8 may be provided with holes 11 which may be engaged by any suitable form of wrench for turning the same, so as to control the pressure of the spring 9, or it may be provided with wings or extensions 39, as shown in Figs. 9 and 11. By adjusting the position of the member 8 the pressure of the spring 9 may be varied so that the device may be adjusted to operate at any pre-determined pressure of the fluid within the tire. The stem 7 is shown with a scale 10 so that the pressure of the spring may be conveniently determined by observing the position of the member 8 relative to the scale.

The valve member 6 is provided with an opening therethrough into the hollow stem 7 with the valve seat 12 arranged at the opening and an auxiliary valve 13 provided and arranged to normally close the opening through the valve 6. The valve 13 may be guided and maintained on its seat in any suitable manner, as shown it is provided with a stem 14 passing loosely through a guide member 15 supported by a cross bar 18 secured to the casing 3. A spring or resilient member 16 coöperating with the guide 15 and a nut 17 adjustably and resiliently normally maintains the valve 13 closed.

In inflating the tire the ingoing air or fluid raises the valve 13 on its seat and passes into the tire, any backward pressure of the air closing the valve, the closing being accelerated by the spring 16. The fluid conductor for the supply may be secured to the casing 3 or on the hollow stem 7, as may be desired. When the tire is inflated sufficiently the pump or other source of supply may be removed. Any pressure of fluid or air within the tire, however, above that desired, that is, above that for which the valve 6 is set, will open the valve 6 and escape out through the openings 8¹ in the member 8. If at any time the fluid pressure within the tire increases due to the expansion of the contained fluid or for any other reason, above the desired pressure, as determined by the adjustment of the device, the same will escape automatically, thereby relieving the pressure until it is equal to the pressure exerted by the spring 9, at which time the valve 6 will close. If a source of fluid supply to the tire is so connected that the openings 8¹ are open to the atmosphere, it will be impossible to over-inflate the tire, inasmuch as the valve 6 will automatically open when the pressure within the tire reaches the pre-determined value.

In the modified construction shown in Figs. 7 and 8, 19 represents the tube to the tire casing and 20 an additional tube secured thereto. Carried by one of the tubes, as shown by the tube 19, is a valve seat member 21. A valve member 22 normally controls the passage of fluid from the tube 19, as in the other device, the valve being provided with a stem 23 guided by an adjustable member 25 and resiliently maintained in contact with its valve seat by a spring 24 or its equivalent. An auxiliary valve member 26 is arranged to seat at an opening through the valve member 22 as in the other construction, the valve member 26 being provided with a stem 27, a guide 28 and spring 29 or their equivalents, the spring 29 coöperating with the nut 30 and guide 28 maintaining the valve in closed position.

The operation of this form of valve is similar to the form heretofore described. As the fluid is pumped through the tube through the open end, it passes through the stem 23 and past the valve 26, the same automatically opening or checking its return. When the fluid or air in the tube 19 reaches a pre-determined pressure as heretofore described, it automatically operates the valve 22 and escapes out through the openings 25¹ in the adjustable member 25. It is of course obvious that a scale similar to that shown in Fig. 5 may be marked on the outside of the valve for the same purpose as that described.

In Figs. 9, 10 and 11 I show a slightly modified form applicable for use on the common form of valve stem and valve used on automobile or bicycle tires. Referring to these figures, 31 represents the usual valve tube and 32 the valve arranged to coöperate with a suitable valve seat 31¹, the valve being provided with a stem 33 and resilient member 34 and guide 35, or their equivalents for the purpose. This part of the device corresponds to the usual construction commonly used, or is its equivalent. When this form of device is on the tire I provide an auxiliary tube 34 arranged to be secured on the valve tube 31 after the tire has been inflated. The tube 34 is provided with a valve seat member 35, having a valve seat 36 arranged to coöperate with a valve member 37. The valve 37 is provided with a stem 38, an adjustable member 39 or its equivalent, mounted in the end of the tube 34, being provided for guiding the valve in its movement. The valve is normally resiliently maintained on its seat by means of a spring 40 coöperating with the valve and with the adjustable member 39, the pressure required to open the valve depending on the adjustment of the member 39. A scale 41 may also be provided in the valve stem 38 for determining the adjustment. Carried by the tube 34, as shown by the member 35 secured to the tube 34, are rods 42 or their equivalents for the purpose, provided with a suitable part 43 arranged to coöperate with the valve stem 33 and maintain the valve 32 open when the tube or casing 34 is positioned on the stem 31. After the tire has been inflated in the usual manner the part 34 is secured, or as shown is screwed upon the tube 31, thereby opening the valve 32. Upon opening the valve 32 the contained fluid will flow into the tube 31 and into a part of the tube 34, but the same is prevented from escaping by the valve member 37. Any excessive pressure over that desired or pre-determined, either from expansion of the contained fluid, over-inflation or for any other cause, will open the valve 37 and the excess fluid will escape out through the openings 39 or their equivalents. In this form the member 39 is shown with wings or extensions 39² for adjusting the same.

The device as shown is applicable for automobile or bicycle tires and may be adjusted to automatically operate at any pre-determined pressure within the tire.

Having thus described my invention it is obvious that various immaterial modifications may be made in the same without departing from the spirit of my invention, hence I do not wish to be understood as limiting myself to the exact construction, arrangement or combination of parts herein shown and described or uses mentioned.

What I claim as new and desire to secure by Letters Patent is:

1. In a device of the character described, the combination of a casing having a threaded wall intermediate of its ends, a collar within the casing having threads to engage said threads of the wall, said collar providing a valve seat, a cone-shaped valve adapted to engage within the opening of said collar, said valve being open, a spring for normally holding said valve to its seat, and an auxiliary valve operative in opposition to the first mentioned valve and being cone shaped to engage within the opening of the first mentioned valve, a spring for the auxiliary valve and lateral supporting means projecting inwardly from the wall of the casing for the last mentioned valve.

2. In a device of the character described, the combination of a casing having a threaded wall intermediate of its ends, a collar within the casing having threads to engage said threads of the wall, said collar providing a valve seat, a cone-shaped valve adapted to engage within the opening of said collar, said valve being open, a spring for normally holding said valve to its seat, and an auxiliary valve operative in opposition to the first mentioned valve and being cone shaped to engage within the opening of the first mentioned valve, a spring for the auxiliary valve, and means for adjusting the tension of said springs.

In testimony whereof, I have hereunto signed my name in the presence of two subscribing witnesses.

FRANK A. GILCREST.

Witnesses:
W. W. PHILLIP,
S. W. SMITH.